United States Patent
Park et al.

(10) Patent No.: US 12,330,622 B2
(45) Date of Patent: Jun. 17, 2025

(54) HYBRID ELECTRIC VEHICLE AND CONTROL METHOD THEREOF

(71) Applicants: Hyundai Motor Company, Seoul (KR); Kia Corporation, Seoul (KR)

(72) Inventors: Sun Young Park, Ansan-Si (KR); Joon Young Park, Seoul (KR); Sung Deok Kim, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 205 days.

(21) Appl. No.: 18/220,175

(22) Filed: Jul. 10, 2023

(65) Prior Publication Data

US 2024/0116488 A1      Apr. 11, 2024

(30) Foreign Application Priority Data

Oct. 5, 2022   (KR) .................. 10-2022-0127374

(51) Int. Cl.
 *B60W 20/10*   (2016.01)
 *B60W 10/02*   (2006.01)
 (Continued)

(52) U.S. Cl.
 CPC ............ *B60W 20/10* (2013.01); *B60W 10/02* (2013.01); *B60W 10/06* (2013.01); *B60W 10/08* (2013.01); *B60W 10/10* (2013.01); *B60W 10/18* (2013.01); *B60W 2510/0208* (2013.01); *B60W 2510/1005* (2013.01); *B60W 2520/00* (2013.01)

(58) Field of Classification Search
 CPC ...... B60W 20/10; B60W 10/02; B60W 10/06; B60W 10/08; B60W 10/10; B60W 10/18; B60W 2510/0208; B60W 2510/1005; B60W 2520/00; B60W 10/188; B60W 2520/10; B60W 2710/021; B60W 2710/0666; B60W 2710/083; B60W 20/50; B60W 20/30; B60K 2006/268; B60K 2006/4825; B60K 6/48; B60K 6/387;
 (Continued)

(56) References Cited

U.S. PATENT DOCUMENTS 10,336,332 B2   7/2019   Kobayashi

FOREIGN PATENT DOCUMENTS

JP   2016-044744   4/2016
JP   2019-203575   11/2019
(Continued)

OTHER PUBLICATIONS

Machine Translation of Hirano (Japanese Patent Application 2020/035865) (Year: 2020).*

*Primary Examiner* — Alan D Hutchinson
(74) *Attorney, Agent, or Firm* — Morgan, Lewis & Bockius LLP (57) ABSTRACT

A hybrid electric vehicle includes a transmission without a reverse gear and a control method thereof. A situation in which a connection between the motor and the engine is stuck is overcome. When a predetermined condition is met, whether or not an engine clutch is in a specific state is determined. A first driving source is disposed on one end of the engine clutch, and a second driving source is disposed on the other end of the engine clutch. When the engine clutch is in the specific state, reverse driving is prevented. A transmission is controlled to be in a neutral position.

20 Claims, 7 Drawing Sheets

(51) Int. Cl.
*B60W 10/06* (2006.01)
*B60W 10/08* (2006.01)
*B60W 10/10* (2012.01)
*B60W 10/18* (2012.01)

(58) Field of Classification Search
CPC .......................... B60K 2006/266; B60K 6/54; B60Y 2400/76; B60Y 2200/92; Y02T 10/62
See application file for complete search history.

(56) References Cited

FOREIGN PATENT DOCUMENTS

| | | |
|---|---|---|
| JP | 2021-099152 | 7/2021 |
| KR | 10-2015-0074363 | 7/2015 |
| KR | 10-2020-0041153 | 4/2020 |
| KR | 10-2021-0060696 | 5/2021 |
| KR | 10-2022-0016331 | 2/2022 |

\* cited by examiner

HYBRID ELECTRIC VEHICLE AND CONTROL METHOD THEREOF

CROSS REFERENCE TO RELATED APPLICATION

The present application claims priority to Korean Patent Application No. 10-2022-0127374, filed on Oct. 5, 2022, the entire contents of which is incorporated herein for all purposes by this reference.

BACKGROUND OF THE PRESENT DISCLOSURE

Field of the Present Disclosure

The present disclosure relates generally to a hybrid electric vehicle (HEV) including a transmission without a reverse (R) gear and configured to cope with a situation in which the connection between the motor and the engine is stuck, and a control method thereof.

Description of Related Art

Recently, development of eco-friendly vehicles has been actively carried out with increasing interest in environmental preservation. Representative examples of eco-friendly vehicles may include electric vehicles (EVs) and hybrid electric vehicles (HEVs).

A hybrid electric vehicle (HEV) refers to a vehicle that generally utilizes two power sources together. The two power sources are mainly an engine and an electric motor. Such a hybrid electric vehicle is superior in fuel efficiency and power performance and advantageous in terms of exhaust gas reduction, compared to a vehicle only provided with an internal combustion engine (ICE). Thus, recently, a variety of developments have been carried out for hybrid electric vehicles.

Such a hybrid electric vehicle may operate in two driving modes depending on which powertrain apparatus is driven. Of the two driving modes, one is an electric vehicle (EV) mode in which the vehicle drives only using the electric motor, and the other is a hybrid electric vehicle (HEV) mode in which the vehicle obtains power by operating both the electric motor and the engine. The hybrid electric vehicle performs transition between the two driving modes according to conditions while driving. Typically, the transition between the two driving modes is performed to maximize fuel efficiency or driving efficiency depending on efficiency characteristics of the powertrain apparatus.

Figure 1:
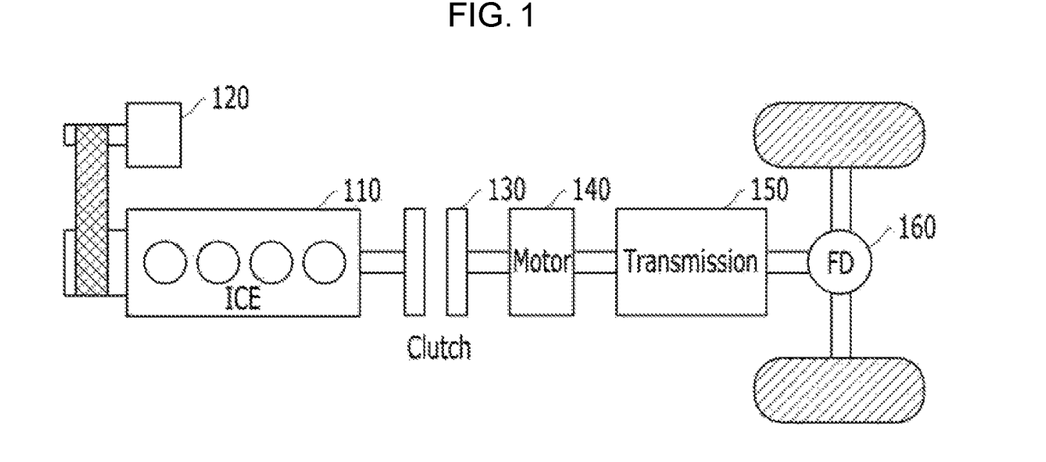
FIG. 1 illustrates an example of a powertrain structure of a typical hybrid electric vehicle.

FIG. 1 illustrates an example of a powertrain structure of a typical hybrid electric vehicle.

In FIG. 1, a powertrain structure of a hybrid electric vehicle in which a parallel mechanism or a transmission mounted electric drive (TMED) mechanism is used.

Referring to FIG. 1, an electric motor (or driving motor) 140 and an engine clutch (EC) 130 are disposed between an internal combustion engine (ICE) 110 and a transmission 150.

Generally, in the present vehicle, when a driver presses the accelerator pedal after starting the vehicle, first, the electric motor 140 is driven using electric power from a battery in a state in which the engine clutch 130 is opened, and then, driving force from the motor moves wheels through the transmission 150 and a final drive (FD) 160 (i.e., EV mode). When greater driving force is required as the vehicle is gradually accelerated, a starter motor 120 may be operated to drive the engine 110.

Consequently, when the speeds of rotation of the engine 110 and the electric motor 140 are close to each other, the engine clutch 130 is closed, so that both the engine 110 and the electric motor 140 or the engine 110 alone operates the vehicle (i.e., transition from the EV mode to the HEV mode). When predetermined engine-off conditions are met (e.g., the vehicle is decelerated), the engine clutch 130 is opened and the engine 110 is stopped (i.e., transition from the HEV mode to the EV mode). Furthermore, in the hybrid electric vehicle, the battery may be charged by converting the driving force of the wheels into electrical energy during braking. This is referred to as braking energy regeneration or regenerative braking.

The starter motor 120 is configured as the starter motor when starting the engine and operates as a generator after the engine is started or when recovering rotational energy of the engine after when the engine is turned off. Thus, the starter motor 120 may be referred to as a "hybrid starter generator (HSG)" or, in some cases, as an "auxiliary motor."

Because the start generation motor 120 plays a role as a start motor on starting an engine and also plays a role as a generator after engine start or rotation energy recovery of an engine on start-off, the start generation motor 120 may be referred to as a "hybrid start generator (HSG)" or "auxiliary motor" in some cases.

However, differently from the engine 110, the electric motor 140 may change the direction of rotation. When driving in the reverse position or reverse driving is necessary, the electric motor 140 allows the driveshaft to rotate in the reverse direction without a reverse (R) gear. This will be described with reference to FIG. 2A and FIG. 2B.

Figure 2A:
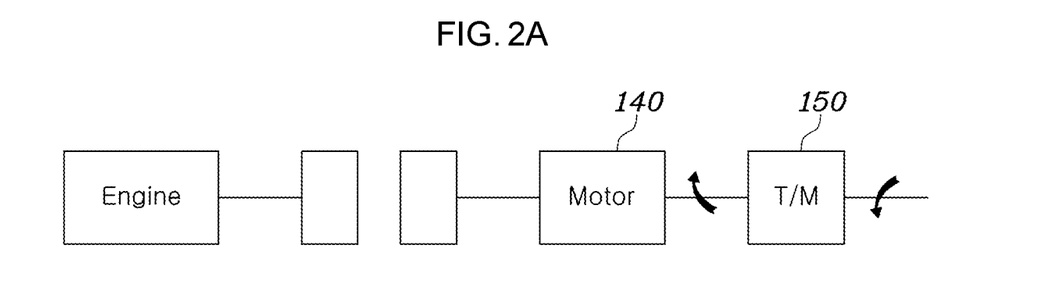
FIG. 2A and FIG. 2B are diagrams illustrating a reverse movement mechanism of a hybrid electric vehicle in which a transmission without a reverse gear is used.
Figure 2B:
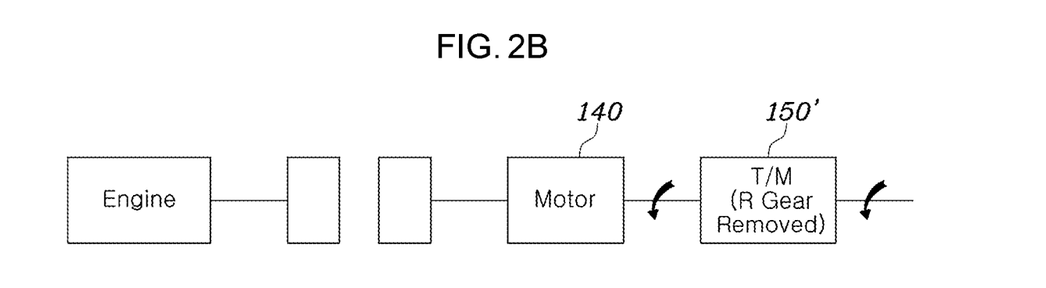

FIG. 2A and FIG. 2B are diagrams illustrating a reverse movement mechanism of a hybrid electric vehicle in which a transmission without an R gear is used. In FIG. 2A and FIG. 2B, it will be assumed that the hybrid electric vehicle moves backward in a state in which the engine clutch is opened.

First, referring to FIG. 2A, in a situation in which the transmission 150 is provided with the R gear, when the electric motor 140 rotates in the forward direction (i.e., a direction the same as the direction of rotation of the engine), the transmission 150 transits the direction of rotation to the reverse direction in the reverse position, so that the output end of the transmission 150 rotates in the reverse direction thereof.

In contrast, as illustrated in FIG. 2B, in a situation in which a transmission 150' is not provided with the R gear, when the motor 140 rotates in the reverse direction, both the input end and the output end of the transmission 150' rotate in the reverse direction in the first gear position. Accordingly, even when the R gear is removed from the transmission, the parallel hybrid electric vehicle may move backward thereof. Due to the simple structure of the transmission 150', improvements in durability and fuel efficiency may also be expected.

However, in a typical hybrid electric vehicle, when the engine clutch 130 is fixed in the lock-up state, reverse driving is not allowed. This is because, during reverse driving in a state in which the engine clutch 130 is closed, when the engine 110 is turned off, there is a risk of reverse rotation of the engine 110, and when the engine 110 is turned on, there is a risk of forward movement of the vehicle in the reverse position. However, when the engine clutch lock-up is detected during reverse driving, it is difficult to prevent reverse rotation of the engine even though reverse driving is stopped.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid electric vehicle (HEV) including a transmission without a reverse (R) gear and configured to cope with a situation in which a connection between the motor and the engine is stuck, and a control method thereof.

The objective of the present disclosure is not limited to the aforementioned description, and other objectives not explicitly included herein will be clearly understood by those skilled in the art from the description provided hereinafter.

In various aspects of the present disclosure, there is provided a control method of a hybrid electric vehicle. The control method may include: when a predetermined condition is met, determining whether or not an engine clutch is in a predetermined state, wherein a first driving source is disposed on a first end of the engine clutch and a second driving source is disposed on a second end of the engine clutch; when the engine clutch is in the predetermined state, preventing reverse driving; and controlling a transmission to be in a neutral position.

The hybrid electric vehicle may include a transmission without a reverse gear.

The predetermined condition may be met when a vehicle speed during the reverse driving is faster than a reference vehicle speed.

The predetermined state may include at least one of a determined state in which the engine clutch is not opened when the engine clutch has an unknown failure state and a lock-up failure state.

The determined state in which the engine clutch is not opened may be determined while driving one of the first driving source and the second driving source, and in accordance with whether or not another of the first driving source and the second driving source rotates.

The first driving source may include an engine. The second driving source may include a motor connected to the transmission.

The first driving source may include a first motor directly connected to the engine. The second driving source may include a second motor connected to the transmission.

The preventing of the reverse driving may include setting a required torque of the first driving source and the second driving source to 0.

The preventing of the reverse driving may include instructing a braking source to brake.

According to another aspect of the present disclosure, there is provided a hybrid electric vehicle including: an engine clutch; a first driving source disposed on a first end of the engine clutch; a second driving source disposed on a second end of the engine clutch; a transmission connected to the second driving source; and a first controller configured to prevent reverse driving and controlling the transmission to be in a neutral position when a predetermined condition is met and the engine clutch is determined to be in a predetermined state.

The transmission may not include a reverse gear.

The predetermined condition may be met when a vehicle speed is faster than a reference vehicle speed during the reverse driving.

The predetermined state may include at least one of a determined state in which the engine clutch is not opened when the engine clutch has an unknown failure state and a lock-up failure state.

The first controller may be configured to determine the determined state in which the engine clutch is not opened while driving one of the first driving source and the second driving source, in accordance with whether or not the other rotates.

The first driving source may include an engine. The second driving source may include a driving motor.

The first driving source may include a first motor directly connected to the engine. The second driving source may include a second motor.

The first controller may prevent the reverse driving by setting a required torque of the first driving source and the second driving source to 0.

The hybrid electric vehicle may further include: a braking device; and a second controller configured to control the braking device. The first controller may prevent the reverse driving by instructing the second controller to control the braking device to brake.

The hybrid electric vehicle may further include a second controller configured to control the transmission. The first controller may instruct the second controller to control the transmission to be in the neutral position.

According to an exemplary embodiment of the present disclosure, when the hybrid electric vehicle including the transmission without the R gear has an engine clutch lock-up failure during reverse driving, it is possible to prevent reverse rotation of the engine and forward movement of the vehicle in the reverse position by controlling the transmission to be in the neutral position.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present disclosure will be described in detail with reference to the accompanying drawings, in which identical or similar constituent elements are provided the same reference numerals regardless of the reference numerals of the drawings, and a repeated description thereof will be omitted. Terms "module" and "part" used in the following description are provided or mixed together only considering the ease of creating the specification, and have no meanings or roles that are distinguished from each other by themselves. In the description of the present disclosure, when it is determined that the detailed description of related art would obscure the gist of the present disclosure, the detailed description thereof will be omitted. Furthermore, the appended drawings are merely intended to be configured to readily understand the exemplary embodiments included herein, and thus the technical idea included herein is not limited by the appended drawings, and it should be understood to include all changes, equivalents, and substitutions included in the idea and technical scope of the present disclosure.

It will be understood that, although terms "first", "second", etc., may be used herein to describe various elements, these elements should not be limited by these terms. These terms are only used to distinguish one element from another element.

It will be understood that when an element is referred to as being "coupled", "connected", or "linked" to another element, it may be directly coupled or connected to the other element or intervening elements may be present therebetween. In contrast, it should be understood that when an element is referred to as being "directly coupled", "directly connected", or "directly connected" to another element, there are no intervening elements present.

As used herein, singular forms "a", "an", and "the" are intended to include the plural forms as well, unless the context clearly indicates otherwise.

It will be further understood that terms "comprise", "include", "have", etc., when used in the present specification, specify the presence of stated features, integers, steps, operations, elements, components, and/or combinations thereof but do not preclude the presence or addition of one or more other features, integers, steps, operations, elements, components, and/or combinations thereof.

Furthermore, a term such as "unit" or "control unit" included in names, such as a motor control unit (MCU) and a hybrid control unit (HCU), is only a term widely used in naming of a controller that is configured to control a specific function of a vehicle but should not be understood as indicating a generic function unit. For example, each of the control units may include: a communication device configured to communicate with another control unit or a sensor to control unique functions of the control unit; a memory storing an operating system (OS), logic instructions, input/output information, and the like; and one or more processors configured to perform determination, computation, decision required for the control of the unique functions.

Prior to description of a driving control method of a hybrid electric vehicle according to an exemplary embodiment of the present disclosure, a control system of a hybrid electric vehicle applicable to various exemplary embodiments will be described.

Figure 3:
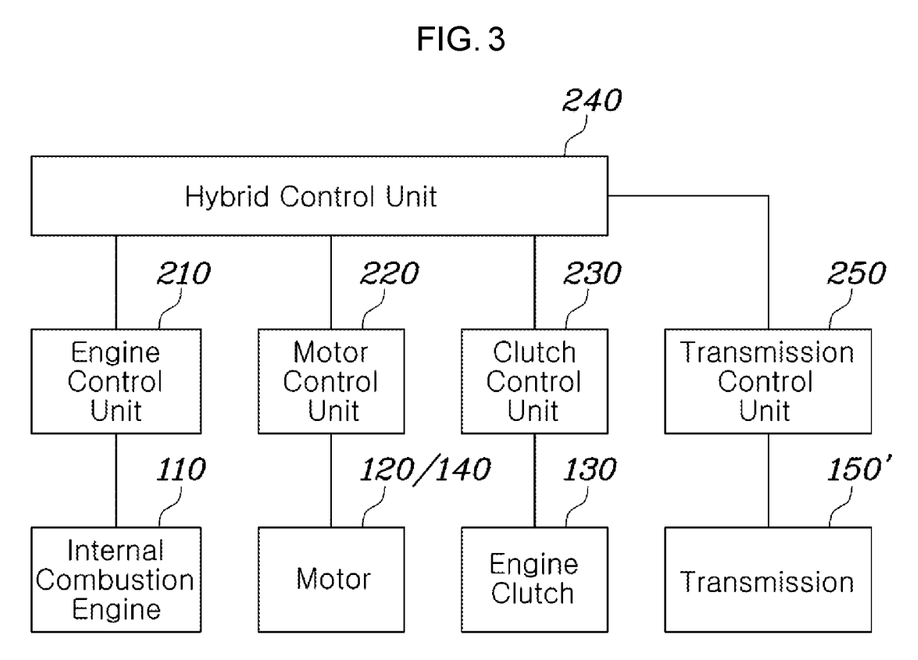
FIG. 3 illustrates an example of a control system configuration of a hybrid electric vehicle according to an exemplary embodiment of the present disclosure.

FIG. 3 illustrates an example of a control system configuration of a hybrid electric vehicle according to an exemplary embodiment of the present disclosure.

Referring to FIG. 3, in the hybrid electric vehicle to which embodiments of the present disclosure are applicable, an internal combustion engine 110 is controlled by an engine control unit 210, torque of a starter motor 120 and a driving electric motor 140 may be controlled by a motor control unit (MCU) 220, and an engine clutch 130 may be controlled by a clutch control unit 230. Here, the engine control unit 210 may also be referred as an engine management system (EMS). Furthermore, a transmission 150' is controlled by a transmission control unit 250.

The motor control unit 220 may be configured for controlling a gate drive unit using a control signal in the form of pulse width modulation (PWM) signal, based on a motor angle, a phase voltage, a phase current, required torque, etc. The gate drive unit may be configured for controlling an inverter to drive the respective motors 120 and 140 in a responsive manner.

Each of the control units is connected to a hybrid control unit (HCU) 240 configured to control the entirety of the powertrain apparatus including a mode transition process as a higher level controller. Each of the control units may provide information required for driving mode change, information required for control of the engine clutch during gear shifting, and/or information required for engine stop control to the hybrid control unit 240 or perform an operation in response to a control signal.

For example, the hybrid control unit 240 is configured to determine whether or not to transit between the EV mode and the HEV mode or between a charge-depleting (CD) mode and charge-sustaining (CS) mode (in a plug-in hybrid electric vehicle (PHEV)). In this regard, the hybrid control unit is configured for determining a time point at which the engine clutch 130 is opened and controls hydraulic pressure when opening the engine clutch 130. Furthermore, the hybrid control unit 240 may be configured to determine the state (e.g., lock-up, slip, open, etc.) of the engine clutch 130, and control a time point at which fuel injection of the engine 110 is stopped. Furthermore, as a purpose of engine stop control, the hybrid control unit may be configured for controlling recovering rotational energy of the engine by transmitting a torque command for torque control of a first motor 120 to the motor control unit 220. Furthermore, as a purpose of meeting required torque, the hybrid control unit 240 may be configured to determine the status of each of the driving sources 110, 120, and 140, determine requirement driving force to be distributed to the driving sources 110, 120, and 140, and transmit commands to the control units 210 and 220 to control the driving sources.

It will be apparent to those skilled in the art that the interrelation of the control units and functions/classification of the control units are for illustrative purposes only and not limited to the terms. For example, one of other control units except for the hybrid control unit 240 may be implemented as having the functions of the hybrid control unit 240, or the functions of the hybrid control unit 240 may be distributed to two or more other control units.

The above-described configuration of FIG. 3 is only an example configuration, but it will be apparent to those skilled in the art that the hybrid electric vehicle applicable to various exemplary embodiments is not limited to such a configuration. Hereinafter, for the sake of brevity, the hybrid powertrain apparatus to which embodiments of the present disclosure are applied will be assumed to be a TMED powertrain apparatus including the transmission 150' from which the R gear is removed as illustrated in FIG. 2B.

According to an exemplary embodiment of the present disclosure, when the state of the engine clutch 130 is unknown, when a failure in which the engine clutch 130 is fixed in a lock-up state (hereinafter, referred to as a "lock-up failure" for the sake of brevity) has occurred, or a control operation of maintaining the engine clutch 130 in a lock-up state has intervened according to the logic, it is provided to stop reverse driving (i.e., driving in reverse), and during reverse driving, control the transmission to be in the neutral position. Here, in a situation in which the engine clutch 130 is unknown, when the engine clutch is determined to be opened, reverse driving may be allowed.

Regarding whether or not the engine clutch is opened, a method of driving only one of respective driving sources connected to one end and the other end of the engine clutch 130 and estimating the state of the engine clutch 130 depending on whether or not the other of the driving sources is rotating may be used.

Hereinafter, a method of estimating the state of the engine clutch according to an exemplary embodiment will be described.

Figure 4:
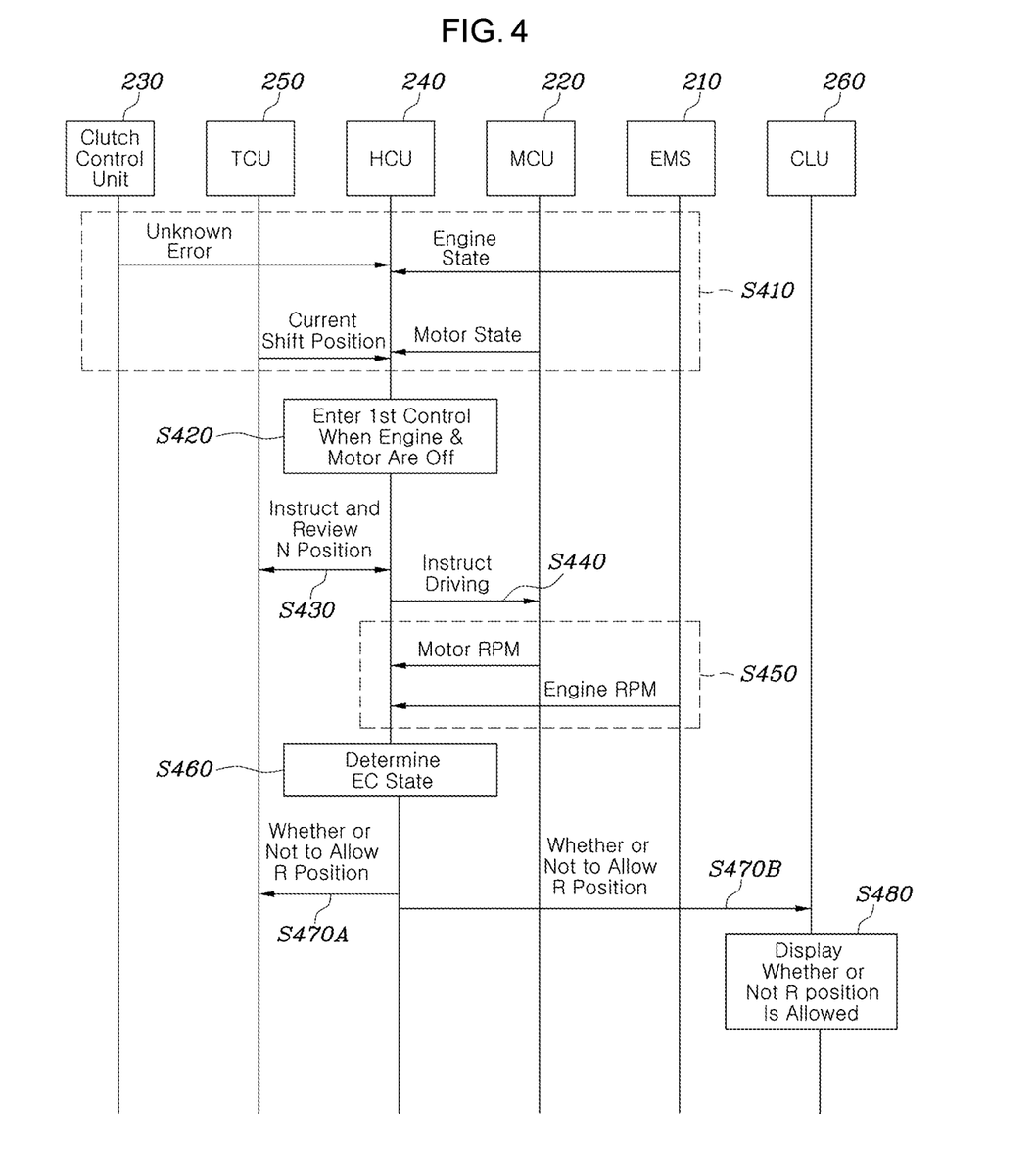
FIG. 4 illustrates an example of a control system-specific process according to an exemplary embodiment of the present disclosure.

FIG. 4 illustrates an example of a control system-specific process according to an exemplary embodiment of the present disclosure.

Referring to FIG. 4, the hybrid control unit 240 may receive powertrain apparatus status information from the lower-level control units 210, 220, 230, and 250 in S410.

The clutch control unit 230 may transmit state information of the engine clutch, the engine control unit 210 may transmit information regarding whether or not the engine 110 started and related to revolutions per minute (RPM) information thereof, the motor control unit 220 may transmit information regarding whether or not the electric motor 140 is driven and related to revolutions per minute (rpm) information thereof, and the transmission control unit 250 may transmit the current shift position. However, these are for illustrative purposes only, and the present disclosure is not limited thereto. For example, the revolutions per minute (rpm) information of the engine 110 and the revolutions per minute (rpm) information of the electric motor 140 may be obtained from sensors provided on the engine 110 and the electric motor 140, respectively. Although not shown in the figures, vehicle speed information may be obtained from a vehicle speed sensor (or a wheel speed sensor). Here, it should be noted that the sequence by which respective pieces of information are received may be different from the illustrated sequence.

When the received information indicates that the state of the engine clutch 130 is unknown, both the engine 110 and the electric motor 140 are turned off, the vehicle is stopped, and the current shift position is the neutral position or the park position, the hybrid control unit 240 may be configured to determine to enter a first-type control process to determine whether or not to allow reverse driving in S420.

Consequently, when the current shift position is the park position, the hybrid control unit 240 instructs the transmission control unit 250 to enter the neutral position and reviews whether or not the shift position is changed to the neutral position in S430.

Furthermore, the hybrid control unit 240 may instruct the motor control unit 220 to drive the electric motor 140 in S440.

The hybrid control unit 240 reviews the revolutions per minute (rpm) of the electric motor 140 and the RPs of the engine 110 in S450 and determines the state of the engine clutch 130 based on the reviewed RPMs in S460. Since the engine 110 is determined to be turned-off in S420 and the electric motor 140 is controlled to operate in S440, the engine 110 should remain stopped when the engine clutch 130 is opened. Thus, the hybrid control unit 240 may be configured to determine the engine clutch 130 to be not opened when the revolutions per minute (rpm) of the engine 110 is greater than 0 and determine the engine clutch 130 to be opened when the engine 110 remains stopped.

As the result of the determination, the hybrid control unit 240 may transmit information regarding whether or not to allow the reverse position to the transmission control unit 250 and a cluster 260 in S470A and S470B. Here, the cluster 260 is only an example of an output device configured to output information regarding whether or not to allow the reverse position, but the present disclosure is not limited thereto. For example, the output device configured to output the information regarding whether or not to allow the reverse position may be implemented as any device, such as a display of an audio, video and navigation (AVN) system or a head-up display (HUD), which may output information in any form, in a non-restrictive manner.

When the reverse position is allowed by the hybrid control unit 240, the transmission control unit 250 may perform reverse driving of the transmission 150' in response to the driver selecting the reverse position by manipulating a shift lever, a shift button, a shift dial, or the like. Otherwise, the shifting may not be performed. Furthermore, when the reverse shifting is not allowed, the cluster 260 may output information indicating that the reverse shifting is not allowed (e.g., using text or an image or by turning on or off a warning light) in S480.

Figure 5:
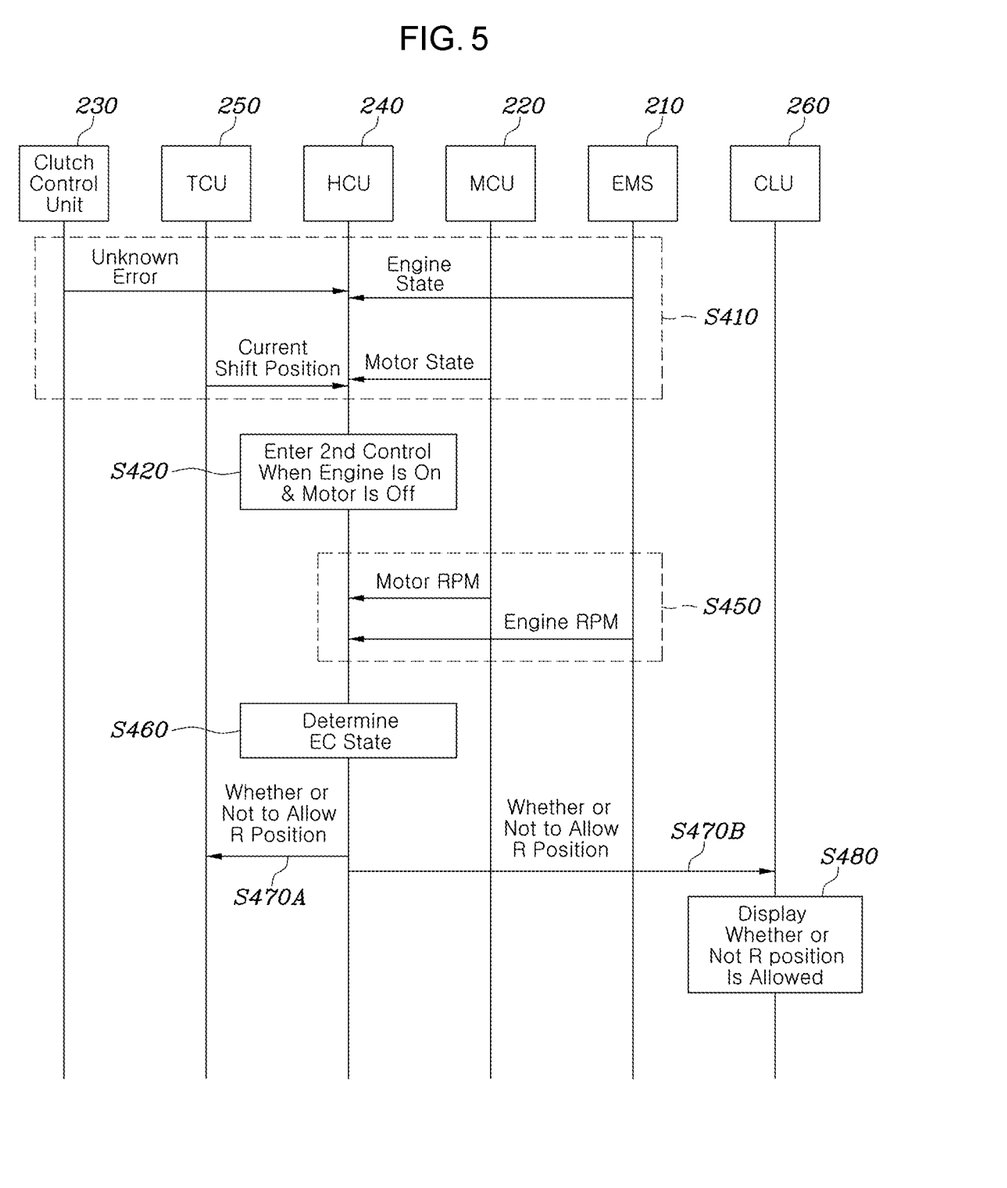
FIG. 5 illustrates another example of the control system-specific process according to an exemplary embodiment of the present disclosure.

FIG. 5 illustrates another example of the control system-specific process according to an exemplary embodiment of the present disclosure. Because some features of the operation illustrated in FIG. 5 are similar to those of the operation illustrated in FIG. 4, differences will be mainly described.

Referring to FIG. 5, the hybrid control unit 240 may receive the vehicle operating status in S410. When the received information indicates that the state of the engine clutch 130 is unknown, the engine 110 is turned on, the electric motor 140 is turned off, the vehicle is stopped, and the current shift position is the neutral position or the park position, the hybrid control unit 240 may be configured to determine to enter a second-type control process to determine whether or not to allow reverse shifting in S420.

Subsequently, the hybrid control unit 240 may review the RPMs of the electric motor 140 and the engine 110 in S450 and determine the state of the engine clutch 130 based on the RPMs in S460. Thus, the hybrid control unit 240 may be configured to determine the engine clutch 130 to be not opened when the revolutions per minute (rpm) of the engine 110 is greater than 0 and determine the engine clutch 130 to be opened when the engine 110 remains stopped.

The subsequent control operations S470A, S470B, and S480 according to the result of the determination are the same as those described above with reference to FIG. 4, and thus repeated descriptions will be omitted.

Figure 6:
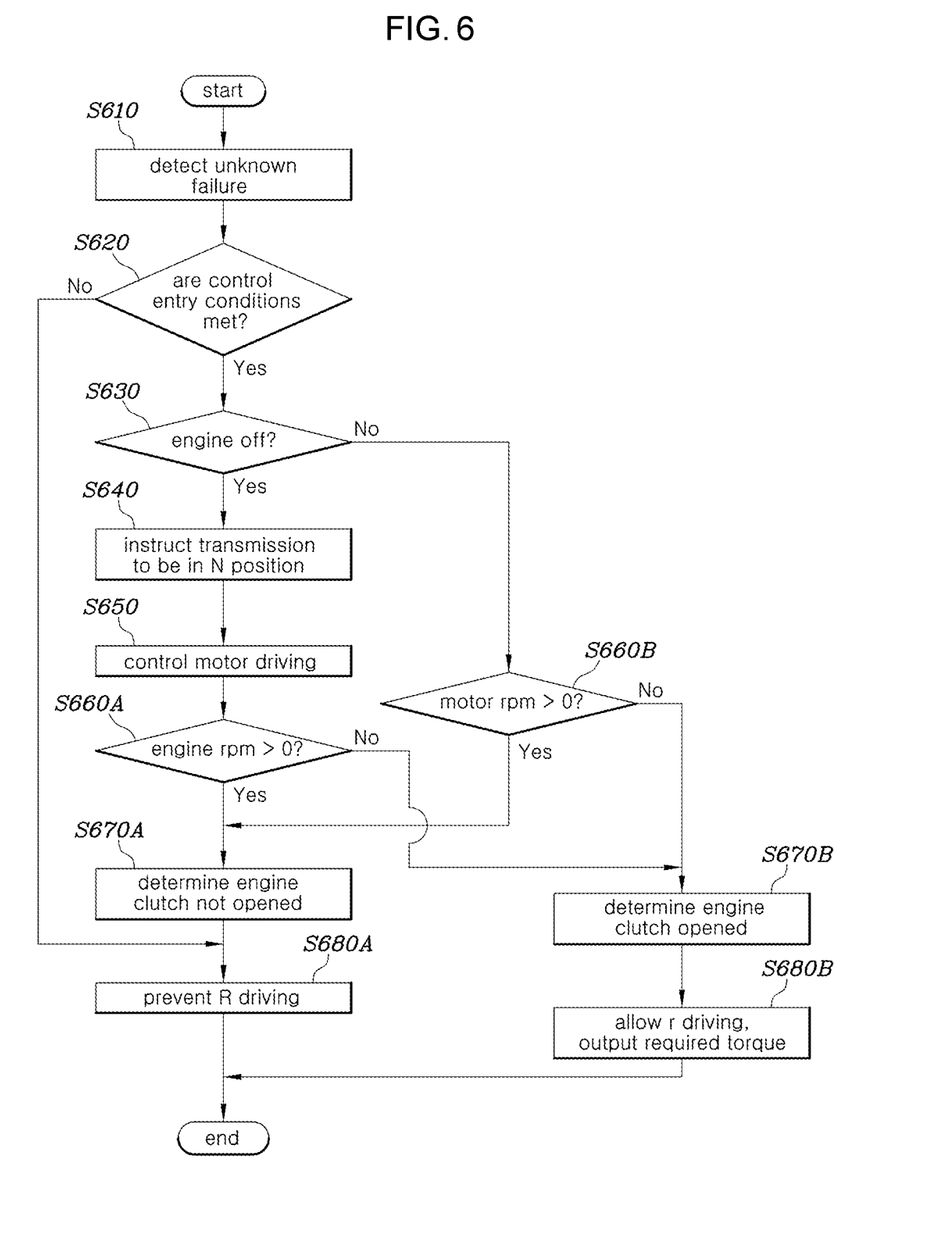
FIG. 6 is a flowchart illustrating an example of a control process of a hybrid electric vehicle according to an exemplary embodiment of the present disclosure.

The control processes described above with reference to FIG. 4 and FIG. 5 may be depicted together in a flowchart as illustrated in FIG. 6.

FIG. 6 is a flowchart illustrating an example of a control process of a hybrid electric vehicle according to an exemplary embodiment of the present disclosure.

Referring to FIG. 6, when an unknown failure in which the state of the engine clutch 130 is unknown is detected in S610, the hybrid control unit 240 may be configured to determine whether or not control entry conditions are met in S620. Here, the control entry conditions may be met when the revolutions per minute (rpm) information of the electric motor 140 and the engine 110 may be obtained ordinarily (i.e., the engine sensor and the motor sensor are normal), the transmission 150 is in the neutral position or the park position, and the vehicle is stopped.

When the control entry conditions are determined to be met as indicated with Yes in S620, the hybrid control unit 240 may instruct the transmission control unit 250 to shift to the neutral position in S640.

When the shift position is determined to be in the neutral position by the transmission control unit 250, the hybrid control unit 240 may instruct the motor control unit 220 to drive the motor in S650.

Afterwards, the hybrid control unit 240 reviews the RPM of the engine, and when the RPM of the engine is greater than 0 as indicated with Yes in S660A, may be configured to determine that the engine clutch 130 is not opened in S670A. Consequently, the hybrid control unit 240 may instruct the transmission control unit 250 to stop reverse driving in S680A.

Differently, when the RPM of the engine remains 0, the hybrid control unit 240 may be configured to determine that the engine clutch 130 is opened in S670B. Thus, the hybrid control unit 240 allows reverse driving, determine required torque to output creep torque from the electric motor 140 in response to the accelerator pedal being operated, and control the driving source(s) responsively in S680B.

After the control entry conditions are determined to be met in S620, when the engine 110 is driving as indicated with No in S630, the hybrid control unit 240 may review the RPM of the motor in S660B. When the RPM of the motor is greater than 0 as indicated with Yes in S660B, the hybrid control unit 240 may be configured to determine the engine clutch 130 is not opened in S670A. When the RPM of the motor remains 0 as indicated with No in S660B, the engine clutch 130 may be determined to be opened in S670B. The subsequent control operations S680A and S680B according to the result of the determination in S670A and S670B are the same as those described above by assuming the engine is turned off as indicated with Yes in S630, thus repeated descriptions will be omitted.

Furthermore, in an exemplary embodiment of the present disclosure, the state of the engine clutch is reviewed in a situation in which a lock-up failure has occurred in the engine clutch 130 during reverse driving or an unknown has occurred, and when the engine clutch is not opened, reverse driving may be prevented, and the transmission may be controlled to be in the neutral position. This will be described with reference to FIG. 7.

Figure 7:
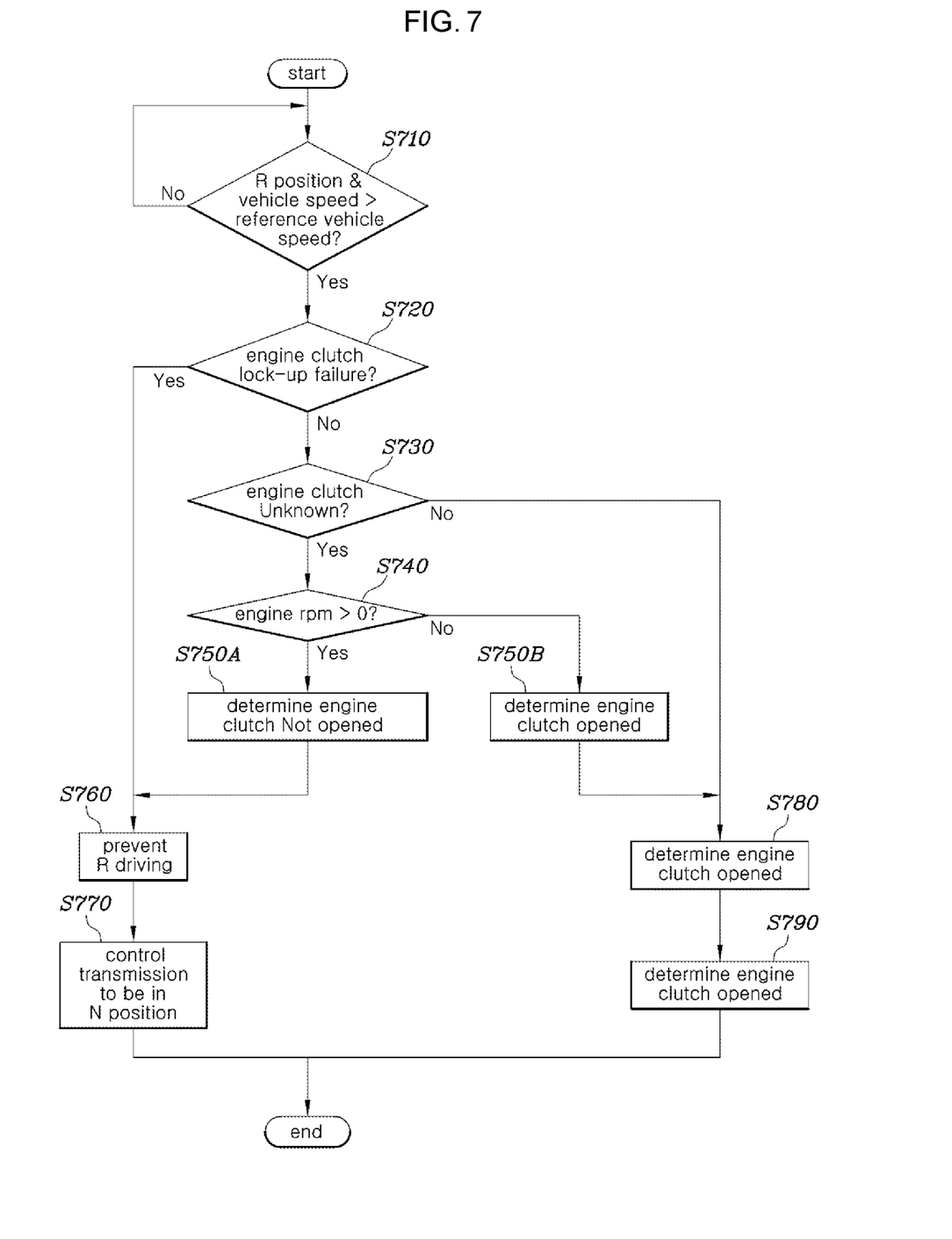
FIG. 7 is a flowchart illustrating an example of a control process of a hybrid electric vehicle after reverse driving is allowed according to an exemplary embodiment of the present disclosure.

FIG. 7 is a flowchart illustrating an example of a control process of a hybrid electric vehicle after reverse driving is allowed according to various exemplary embodiments of the present disclosure.

In FIG. 7, a situation in which reverse driving is started in a normal state of the engine clutch 130 or the engine clutch 130 is determined to be opened as the result of determining the state of the engine clutch 130 through the process described above with reference to FIG. 6 and reverse driving is allowed (i.e., a situation subsequent to step S680B in FIG. 6) will be assumed.

Referring to FIG. 7, when the current shifting position is the reverse position and the vehicle speed is faster than a reference vehicle speed as indicated with Yes in S710, the hybrid control unit 240 may review the state of the engine clutch in S720. Here, the reference vehicle speed may be 0, but this is for illustrative purposes only, and the present disclosure is not limited thereto.

When a lock-up failure has occurred in the engine clutch as indicated with Yes in S720, the hybrid control unit 240 may prevent reverse driving in S760 and instruct the transmission control unit 250 to control the transmission 150 to be in the neutral position in S770. Here, preventing reverse driving may include at least one control operation of i) setting required output of the driving sources to 0, ii) transmitting a braking instruction to a braking control unit (e.g., an integrated brake actuation unit (IBAU, not shown)) configured to control a braking device (e.g., a hydraulic brake), and not allowing reverse driving after the neutral position control in S770. In addition to the lock-up failure, in a situation in which a control operation of maintaining the engine clutch 130 in a lock-up state has intervened, processing similar to Yes in S720 may be performed. For example, the control operation of maintaining the engine clutch 130 in the lock-up state may correspond to a situation in which a specific control unit or a specific function has failed or a control operation essentially including the lock-up of the engine clutch 130 as in lock charge driving (i.e., generating electricity from the motor using driving force of the engine in a state in which the engine and the motor are constantly connected due to the engine clutch locked up) has intervened. However, these are for illustrative purposes only, and the present disclosure is not limited thereto.

When the statue of the engine clutch 130 is unknown as indicated with Yes in S730, the hybrid control unit may review the RPM of the engine in S740.

When the RPM of the engine is greater than 0 as indicated with Yes in S740, the hybrid control unit 240 may be configured to determine the engine clutch 130 to not be opened in S750A, prevent reverse driving in S760, and control the transmission to be in the neutral position in S770.

In contrast, when the engine 110 is stopped as indicated with No in S740, the hybrid control unit 240 may be configured to determine the engine clutch 130 to be opened in S750B, allow reverse driving in S780, and control the electric motor 140 to output required torque in S790.

Furthermore, when no lock-up failure has occurred in the engine clutch 130 as indicated with No in S720 and the state of the engine clutch 130 is not unknown as indicated with No in S730, the hybrid control unit 240 may allow reverse driving in S780 and control the electric motor 140 to output required torque in S790.

When the engine clutch 130 is determined to not be opened through the above-described control operations in a situation in which the lock-up failure has occurred in the engine clutch 130 or the state of the engine clutch 130 is unknown, reverse driving is prevented and the transmission is controlled to be in the neutral position. Consequently, even in the case in which the engine 110 rotates in the revere direction, the RPM (i.e., peak RPM) and the reverse rotation time may be reduced. Thus, the durability of the engine may be improved. Furthermore, when the lockup has occurred in the engine clutch 130 during reverse driving, a high level of vibration occurs in the vehicle until the engine 110 is stopped. In the instant case, the vibration in the vehicle may be reduced by controlling the transmission to be in the neutral position until the engine 110 is stopped.

In the foregoing embodiments, in a situation in which the wheels are separated from the driving sources (i.e., in the neutral position or the park position) to review the state of the engine clutch 130, one of the engine 110 and the electric motor 140 was driven and whether or not the other one rotates is determined. In contrast, according to another exemplary embodiment of the present disclosure, in a situation in which there is an open fail diagnosis in which opening the engine clutch 130 has failed or a launch or limp-home situation in which the vehicle is controlled to not depart by slipping the transmission 150 in a closed state of the engine clutch 130, the engine clutch 130 may be determined to not be opened.

Furthermore, although the hybrid powertrain apparatus as illustrated in FIG. 1 has been taken in the foregoing embodiments, the state of the engine clutch 130 may be estimated only using the motor in a hybrid powertrain apparatus in which the motor performing a function corresponding to the starter motor 120 is directly connected to the engine 110. This will be described with reference to FIG. 8.

Figure 8:
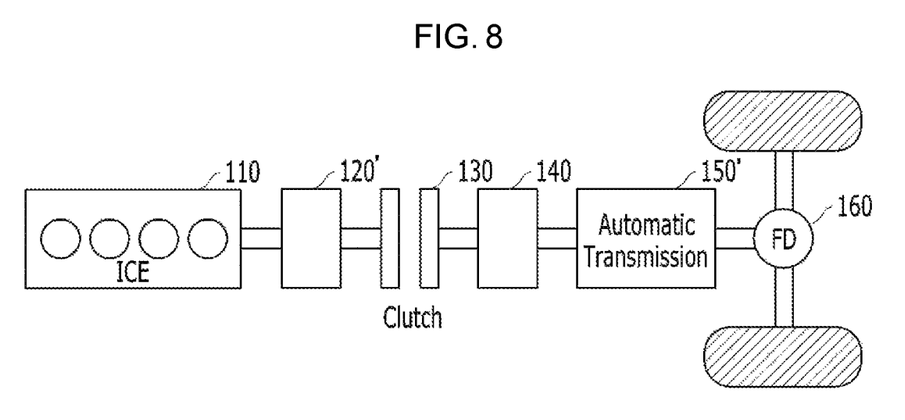
FIG. 8 illustrates an example of a powertrain structure of a hybrid electric vehicle according to another exemplary embodiment of the present disclosure.

FIG. 8 illustrates an example of a powertrain structure of a hybrid electric vehicle according to another exemplary embodiment of the present disclosure.

In the hybrid powertrain apparatus illustrated in FIG. 8, a motor 120' is provided between the engine clutch 130 and the engine 110 and directly connected to the engine 110. According to the present structure, in a situation in which the engine clutch 130 is not opened, when one of the motor 120' disposed on one end of the engine clutch 130 and the electric motor 140 disposed on the other end of the engine clutch 130 is being driven, the other also rotates. Thus, the hybrid control unit 240 may be configured to determine whether or not the engine clutch 130 is opened by instructing the motor control unit 220 to drive one of the two motors 120' and 140 and monitoring the RPM of the other.

The present disclosure as described above may be implemented as computer-readable codes in a program recorded medium. The computer-readable media may include all types of recording devices in which data readable by a computer system is stored. Examples of the computer-readable media include hard disk drives (HDDs), solid state disks (SSDs), silicon disk drives (SDDs), read-only memory (ROM), random access memory (RAM), compact disc read-only memory (CD-ROM), magnetic tape, floppy disks, optical data storage devices, and the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control method of a hybrid electric vehicle, the control method comprising:
    when a predetermined condition is met, determining, by a controller, whether or not an engine clutch is in a predetermined state, wherein a first driving source is disposed on a first end of the engine clutch and a second driving source is disposed on a second end of the engine clutch;
    when the engine clutch is in the predetermined state, preventing, by the controller, reverse driving; and
    controlling, by the controller, a transmission to be in a neutral position.

2. The control method of claim 1, wherein the hybrid electric vehicle includes the transmission without a reverse gear.

3. The control method of claim 2, wherein the predetermined condition is met when a vehicle speed during the reverse driving is faster than a reference vehicle speed.

4. The control method of claim 2, wherein the predetermined state includes at least one of a state in which the engine clutch is not opened when the engine clutch has an unknown failure state and a lock-up failure state.

5. The control method of claim 4, wherein the state in which the engine clutch is not opened is determined while driving one of the first driving source and the second driving source, and in accordance with whether or not another of the first driving source and the second driving source rotates.

6. The control method of claim 1,
    wherein the first driving source includes an engine, and
    wherein the second driving source includes a motor connected to the transmission.

7. The control method of claim 1,
    wherein the first driving source includes a first motor directly connected to an engine, and
    wherein the second driving source includes a second motor connected to the transmission.

8. The control method of claim 1, wherein the preventing of the reverse driving includes setting a required torque of the first driving source and the second driving source to 0.

9. The control method of claim 1, wherein the preventing of the reverse driving includes instructing a braking source to brake.

10. A non-transitory computer-readable recording medium in which a program for executing the control method as claimed in claim 1 is recorded.

11. A hybrid electric vehicle comprising:
    an engine clutch;
    a first driving source disposed on a first end of the engine clutch;
    a second driving source disposed on a second end of the engine clutch;
    a transmission connected to the second driving source; and
    a first controller configured to prevent reverse driving and controlling the transmission to be in a neutral position when a predetermined condition is met and the engine clutch is determined to be in a predetermined state.

12. The hybrid electric vehicle of claim 11, wherein the transmission does not include a reverse gear.

13. The hybrid electric vehicle of claim 12, wherein the predetermined condition is met when a vehicle speed is faster than a reference vehicle speed during the reverse driving.

14. The hybrid electric vehicle of claim 12, wherein the predetermined state includes at least one of a state in which the engine clutch is not opened when the engine clutch has an unknown failure state and a lock-up failure state.

15. The hybrid electric vehicle of claim 14, wherein the first controller is further configured for determining the state in which the engine clutch is not opened while driving one of the first driving source and the second driving source, in accordance with whether or not another of the first driving source and the second driving source rotates.

16. The hybrid electric vehicle of claim 11,
    wherein the first driving source includes an engine, and
    wherein the second driving source includes a driving motor.

17. The hybrid electric vehicle of claim 11,
    wherein the first driving source includes a first motor directly connected to the engine, and
    wherein the second driving source includes a second motor.

18. The hybrid electric vehicle of claim 11, wherein the first controller is further configured to prevent the reverse driving by setting a required torque of the first driving source and the second driving source to 0.

19. The hybrid electric vehicle of claim 11, further including:
    a braking device; and
    a second controller configured to control the braking device,
    wherein the first controller is further configured to prevent the reverse driving by instructing the second controller to control the braking device to brake.

20. The hybrid electric vehicle of claim 11, further including:
    a second controller configured to control the transmission,
    wherein the first controller is further configured to instruct the second controller to control the transmission to be in the neutral position.

* * * * *